United States Patent
Rasche et al.

(10) Patent No.: US 6,463,965 B1
(45) Date of Patent: Oct. 15, 2002

(54) ARRANGEMENT FOR STORING FUEL AND METHOD FOR OPERATING A FUEL TANK

(75) Inventors: Christian Rasche, Bochum (DE); Bernd Wiemann, München (DE); Holger Klos, München (DE); Hans-Dieter Wilhelm, Neu-Anspach (DE); Karl Eck, Frankfurt (DE); Thomas Zapp, Dortmund (DE); Bernd Rumpf, Nidderau (DE)

(73) Assignees: Siemens AG, München (DE); Vodafone AG, Düsseldorf (DE)

( * ) Notice: Subject to any disclaimer, the term of this patent is extended or adjusted under 35 U.S.C. 154(b) by 0 days.

(21) Appl. No.: 09/856,583
(22) PCT Filed: Nov. 22, 1999
(86) PCT No.: PCT/DE99/03758
§ 371 (c)(1), (2), (4) Date: Jun. 14, 2001
(87) PCT Pub. No.: WO00/30883
PCT Pub. Date: Jun. 2, 2000

(30) Foreign Application Priority Data

Nov. 23, 1998 (DE) .......................................... 198 54 997

(51) Int. Cl.⁷ ................................................. B65B 1/04
(52) U.S. Cl. ..................... 141/65; 141/301; 141/198; 137/587; 123/519

(58) Field of Search ........................... 141/59, 301, 302, 141/286, 290, 303, 305, 307, 308, 65, 95, 198; 137/587–589; 123/516–521; 220/746, 749, 86.2

(56) References Cited

U.S. PATENT DOCUMENTS 5,123,459 A 6/1992 Toshihiro ...................... 141/59
5,819,796 A * 10/1998 Kunimitsu et al. ......... 123/519

FOREIGN PATENT DOCUMENTS

DE          41 32 741       4/1993

* cited by examiner

*Primary Examiner*—Steven O. Douglas
(74) *Attorney, Agent, or Firm*—Cohen, Pontani, Lieberman & Pavane

(57) ABSTRACT

A fuel tank having an inlet and an outlet is connected to a separate pressure vessel by means of a pump. Fuel vapors are pumped out of the tank and into the pressure vessel while the tank is being filled via the inlet, so that fuel vapors cannot escape during filling. After filling, the inlet is closed and the pressure in the tank is increased to about 4 bar by means of a pressure regulator in a line connecting the pressure vessel to the fuel tank. The pump is then switched off and the fuel can be delivered to the engine via the outlet under the increased fuel pressure in the tank, the pressure being reduced to fuel system pressure by a pressure regulator in the outlet line.

21 Claims, 1 Drawing Sheet

ARRANGEMENT FOR STORING FUEL AND METHOD FOR OPERATING A FUEL TANK

BACKGROUND OF THE INVENTION

1. Field of the Invention

The present invention is directed to an arrangement, particularly in a vehicle, for storing liquid fuel, with a fuel tank having a fuel tank inlet and a fuel tank outlet. The invention is further directed to a method for operating a fuel tank.

2. Description of the Related Art

Fuel tanks of the type mentioned above have already been known for a long time and are used, for example, to store fuels in vehicles of all types.

Particularly when filling such fuel tanks with fuel, e.g., gasoline or the like, high fuel permeation rates and a high degree of evaporation loss of fuel can occur. In particular, the evaporation products are sometimes very harmful.

Due to increasingly strict legal requirements, there is a need to provide tank systems in which fuel emissions can be reduced to a minimum. Up to the present, complicated aeration and ventilation techniques and elaborate sealing systems have been used in such cases. Such techniques include, for instance, active charcoal filters. However, active charcoal filters require a series of connections and aeration lines, which involves high expenditure on construction and correspondingly increased costs. Further, because of the relatively high number of required connections and connection pieces, the risk of possible fuel leakage is also increased. Moreover, since the fuel tanks generally have a complicated geometric contour, a series of fuel pumps is needed in order to transport the fuel located in the fuel tank to the outlet of the fuel tank. However, the pumps consume energy and lead to a complicated construction of the fuel tank.

SUMMARY OF THE INVENTION

The invention provides for storing fuels in such a way that the disadvantages mentioned above are prevented. In particular, an arrangement is provided in which fuel can be stored in a simple and economical manner without resulting in fuel emissions. Moreover, an effective delivery of fuel is made possible. Further, a correspondingly improved method for operating a fuel tank is provided.

Based on the prior art mentioned above, it is the object of the present invention to further develop an arrangement of the type described above for storing fuels in such a way that the disadvantages mentioned above are prevented. In particular, an arrangement is to be provided for storing fuel in which fuel can be stored in a simple and economical manner without resulting in fuel emissions. Moreover, an effective delivery of fuel should also be made possible. Further, a correspondingly improved method for operating a fuel tank should also be provided.

This object is met according to the first aspect of the invention by an arrangement, particularly in a vehicle, for storing fuel, with a fuel tank having a fuel tank inlet and a fuel tank outlet, a pressure vessel for storing gases and a delivery arrangement, especially a pump. The delivery side or pressure side of the delivery arrangement is connected with the pressure vessel and the suction side of the delivery arrangement is connected with the fuel tank. The pump and the pressure vessel for storing gases are associated with the arrangement with the fuel tank and are not, for instance, a component part of the fueling system used for introducing the fuel into the tank.

The basic idea of the present invention is to solve the set of problems involving ventilation and aeration by conveying the gas (vapors) in the fuel tank by means of a delivery device to a separate pressure vessel before the start of the fueling process and during the fueling process. In this way, a pressure prevailing in the fuel tank is reduced. The pressure vessel can—but need not exclusively—be rated at 60 bar, for example.

The invention is not limited to particular delivery devices, so that different solutions are possible. However, it is advantageous to use a pump. The pump regulates the internal gas pressure in the pressure vessel, so that a balancing of the fuel tank with the outside pressure is carried out in order to make it possible to fill the fuel tank with fuel. When the pressure occurring in the fuel tank during operation is about 4 bar, the pressure in the fuel tank can be reduced from 4 bar to atmospheric pressure by the pump. By pumping out the vapor located in the fuel tank, this vapor cannot exit from the fuel tank during the subsequent fueling process. Further, the pump also continues to operate during the fueling process. In this way, a vacuum pressure is built up in the fuel tank, so that it is ensured that no fuel vapors can escape during the fueling process.

The pump is advantageously a high-performance pump. The pumping capacity of the pump can be optionally selected depending on requirements. It is important only that the pumping capacity of the pump is adapted to the maximum fueling rate.

The fuel tank can have any desired shape. Since the arrangement is preferably used as a pressure-type tank system for storing fuels, the fuel tank can be advantageously produced in a pressure-tight manner in an all-plastic composite construction. Fuel tanks of this kind can withstand operating pressures of 4 bar and greater, for example.

The fuel tank can be constructed as a single-chamber or multiple-chamber tank. The removal of fuel via the fuel tank outlet is generally carried out at the lowest point. In a multiple-chamber tank or with complicated fuel tank shapes, the fuel transport reaches the lowest point of the system, for example, via communicating tubes. These tubes should be integrated in the fuel tank in order to keep the fuel permeation rates low. However, flexible communicating tubes which are not injected into the fuel tank but which, as flexible tubes, enable level compensation are also possible.

In principle, the invention is not limited to determined fuel types. Accordingly, any liquid fuel can be used. Two examples of suitable fuels are gasoline and methanol.

Within the framework of introducing methanol as a fuel for fuel cell vehicles, the arrangement according to the invention offers a completely novel tank concept. Any environmental incompatibility or hazards due to methanol can be eliminated since the arrangement according to the invention is constructed as a closed system. Introduction of methanol and the possibility of reducing fuel emissions considerably in conventional arrangements for storing fuel are two special advantages of the arrangement according to the invention.

Further, substantial advantages are achieved by the arrangement according to the invention with respect to design and cost. For example, the active charcoal filters that were previously necessary can be dispensed with and their elaborate ventilation and aeration technology, including the valves needed for this purpose, can also be done away with. Exchange of air with the atmosphere does not take place in the arrangement according to the invention. Moreover, a series of connection pieces which also always represent potential leaks are also eliminated; as a result, the fuel evaporation rate is also minimized.

The arrangement according to the invention can be advantageously used in vehicles, for example, land vehicles, water vehicles and air vehicles. The invention is not limited to determined types of vehicle. However, the invention is advantageously used in land vehicles such as automobiles or the like.

A first pressure regulator which is connected with the pressure vessel and with the fuel tank is preferably provided. The fuel delivery from the fuel tank is carried out via a second pressure regulator of this type. For this purpose, the fuel vapor located in the pressure vessel is introduced into the fuel tank after the latter is filled with fuel. Accordingly, pressure which is greater than the system pressure of the engine, for example, is applied to the fuel tank from the pressure vessel via the first pressure regulator. The fuel can be conveyed to the fuel tank outlet and, from there, delivered to the engine in a very simple manner by means of the pressure in the fuel tank.

When using a fuel tank such as that described above, the fuel tank can utilize a pressure level of 4 bar or more, for example, in order to deliver the fuel to the fuel tank outlet. Therefore, the fuel pumps which were previously necessary can be dispensed with. The pressure regulator can be designed in such a way, for example, that it regulates the gas stored in the pressure vessel at a pressure of 60 bar to a pressure of 4 bar required for the fuel tank when overflowing into the fuel tank. Naturally, the invention is not limited to the described pressure values.

In a further development, the pressure regulator can have a valve, preferably a crash valve, as it is called. When the arrangement is installed in a vehicle, for example, the valve can provide for a defined pressure compensation with the atmosphere in the event of an accident. Further, the valve can be constructed in such a way that it closes the pressure regulator in case of an accident such that fuel is prevented from exiting the fuel tank.

The delivery device, particularly the pump, is advantageously connected with the fuel tank via a valve, particularly a float valve. A valve of this kind prevents liquid fuel from being conveyed into the pump and therefore also into the pressure vessel. The valve is advantageously constructed in such a way that it switches off the pump in this case. The valve is preferably a float valve with a reed switch.

In a further development, a fill pipe can be provided for filling the fuel tank with fuel and is connected with the fuel tank inlet.

The fill pipe should advisably be connected at its free end to a sealing device and/or a tank closure.

A fueling nozzle, for example, can be sealed by means of a sealing device (mechanical seal) during the fueling process in such a way that an evaporation of fuel is prevented. The sealing device can be constructed, for example, as a mechanical fuel seal.

The tank closure which closes the fill pipe and, therefore, also closes the entire arrangement, can be coupled with the delivery device, for example, in such a way that when the tank closure is actuated the delivery device is also put into operation so as to pump off the gases located in the fuel tank first before the start of the fueling process and reduce the pressure in the fuel tank. The coupling of the tank closure with the delivery device can be adjusted in such a way that the tank closure can not be opened until there is no longer above-atmospheric pressure in the fuel tank.

The fill pipe advantageously has one or more, preferably two, sensors for measuring the fuel level. The operation of the delivery device can be controlled during the fueling process by means of these sensors. For example, if the delivery device was controlled by the actuation of the tank closure in such a way that the above-atmospheric pressure in the fuel tank was reduced, the sensors can be used to further reduce the pressure in the fuel tank via the delivery device, so that a vacuum pressure occurs in the fuel vessel. This vacuum pressure prevents fuel vapors from escaping outward from the fill pipe during the fueling process.

When the fuel level in the fill pipe exceeds an upper mark formed by a sensor of this type, for example, the delivery device is put into operation. However, when the fuel level has reached a lower mark formed by another sensor, the delivery device is turned off. In this case, the running time of the delivery device, for example, the pump running time, is controlled via a minimum/maximum regulation formed by the preferably two sensors. Naturally, other types of regulation are also possible, for instance, regulation with only one sensor or with more than two sensors.

In a further development, the fill pipe can have an air trap or siphon. Use of a siphon of this kind can prevent air from being conveyed from the atmosphere into the fuel tank and through the fuel tank into the pressure vessel during the fueling process.

A closing element can preferably be provided for closing the fuel tank inlet. The closing element prevents overpressure in the fill pipe caused by the fuel tank. When the closing element is formed as a flap, for example, the fuel tank inlet is closed by the flap similar to a non-return valve due to the inherent weight of the flap which is advantageously arranged so as to be swivelable and due to the pressure from the tank interior.

The pressure vessel advantageously has one or more pressure sensors. It may be determined via a pressure sensor, for example, whether liquid condensation is occurring in the pressure vessel. If so, the liquid is detected via the pressure sensor and is conveyed back into the fuel tank via a suitable device, e.g., a bypass.

A pressure sensor can also be used for determining the fill level in the fuel tank. This can be carried out via indirect measurement of the pressure curve in the pressure vessel. For this purpose, a determined pressure characteristic line of the pressure vessel corresponding to the filling level is stored and is compared with the pressure values measured by the pressure sensor. Calibration points can be arranged in the fuel tank in order to calibrate the measurement.

If needed, the two different measurements can be carried out by one or more pressure sensors.

In a further construction, the pressure vessel can be connected with a regenerating valve. If air from the atmosphere should reach the pressure vessel, this can be determined via pressure monitoring in the pressure vessel, the switching of the valve for the delivery device or indirect fill level indication. This air can then be guided out via the regenerating valve in a controlled manner and supplied to the engine.

Further, a pressure regulator is preferably connected with the fuel tank outlet. The fuel is supplied to the engine from the fuel tank via this pressure regulator which reduces the pressure in the fuel tank to the system pressure of the engine.

According to the second aspect of the present invention, a method is provided for operating a fuel tank having a fuel tank inlet and a fuel tank outlet, which method can be carried out particularly using an arrangement according to the invention as described above. The method is characterized by the following steps:

a) At the start of a filling process for filling the fuel tank, gases located in the fuel tank are pumped out via a delivery device, particularly a pump, into a separate pressure vessel, so that the pressure in the fuel tank is reduced;

b) The fuel tank is filled with fuel while the delivery device continues to operate at the same time;

c) At the conclusion of the filling process, the delivery device is switched off and the fuel tank inlet is closed via a suitable closing element.

A method of this type makes it possible in a simple and economical manner to fill a fuel vessel with fuel without resulting in disadvantageous fuel emissions into the atmosphere. Reference is had to the above-mentioned constructions of the arrangement according to the invention in their entirety with regard to the advantages, actions, effects and operation of the method.

The method is advantageously begun by actuating the tank closure, so that the delivery device is put into operation and the gas is pumped out of the fuel tank into the pressure vessel. The delivery device is constructed, for example, as a pump which pumps the gas into the pressure vessel with a rating of 60 bar, for example. The pump regulates the internal gas pressure of the pressure vessel in such a way, for example, that the pressure in the fuel tank is adjusted to the external pressure in order to make it possible to fill the fuel tank with fuel. In general, this is carried out by reducing the gas pressure in the interior of the fuel tank, for example, from 4 bar or more to atmospheric pressure. As the delivery device continues to operate also during the fueling process, the pressure in the fuel tank is reduced even further—and, therefore, to vacuum pressure—so that it is ensured that no fuel gases can evaporate into the atmosphere during the fueling process.

In order to discharge the fuel tank, the gas located in the pressure vessel is advantageously introduced into the fuel tank, preferably via a pressure regulator. The fuel under pressure is then drained via the fuel tank outlet. In order to deliver the fuel, the fuel tank is accordingly acted upon by pressure which is greater than the fuel system pressure of the engine. A pressure of this kind is, for example, 4 bar or more.

In a further development, the pressure of the fuel exiting from the fuel tank outlet can be regulated via a pressure regulator. This pressure regulator reduces the pressure prevailing in the fuel tank to the fuel system pressure of the engine.

The fuel can advantageously be introduced into the fuel tank via a fill pipe which is connected with the fuel tank inlet.

The delivery device is preferably put into operation at the start of the fueling process by the actuation of the tank closure. Further, while fuel is supplied via the fill pipe, the operation of the delivery device can be advantageously regulated by one or more, preferably two, sensors located in the fill pipe for measuring the liquid level in the fill pipe.

In a further development, the pressure in the pressure vessel and/or the pressure in the fuel tank can be measured by one or more pressure sensors.

The fuel can advantageously be conducted via a siphon located in the fill pipe when introduced into the fuel tank.

BRIEF DESCRIPTION OF THE DRAWINGS

The Figure shows a schematic circuit arrangement of an arrangement according to the invention for storing fuel.

The Figure shows an arrangement 10 for storing fuel, for example, gasoline. The arrangement 10 has a fuel tank 11 which is produced in an all-plastic composite construction so as to be tight against pressure up to at least 4 bar. The fuel tank 11 has a fuel tank inlet 18 and a fuel tank outlet 15. The fuel tank 11 is connected with a fill pipe 20 via the fuel tank inlet 18.

Figure 1:
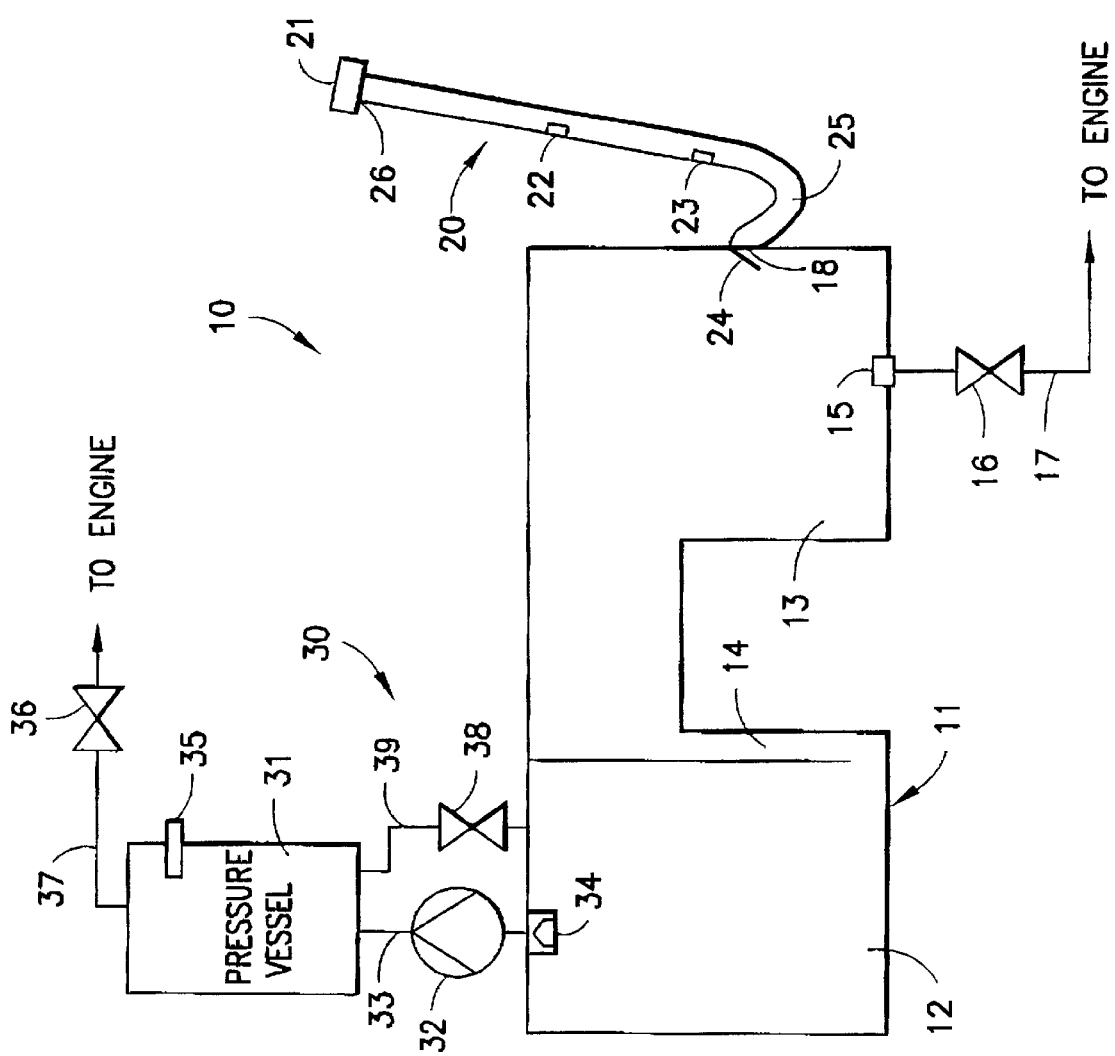

The fill pipe 20 has a siphon 25 and can be closed at its free end 26 by means of a tank cap 21. Further, two sensors 22 and 23 are provided in the fill pipe 20 for controlling a delivery device 32. The fuel tank inlet 18 can be closed via a closing element 24 which is constructed with a pivotable flap in the manner of a check valve.

The fuel tank 11 is constructed as a two-chamber tank and accordingly has two tank chambers 12 and 13. The tank chambers 12 and 13 are connected with one another via a communicating tube 14.

The fuel tank outlet 15 is arranged at the lowest location of the fuel tank 11. It is connected with an engine, not shown, via a line 17 and a pressure regulator 16 provided in this line.

The fuel tank 11 is further connected with a pressure system 30. The pressure system 30 has a pressure vessel 31 which is rated to a pressure of approximately 60 bar and which is connected with the fuel tank 11 via a delivery device 32 designed as a pump and a corresponding line 33. Further, a float valve 34 is provided between the fuel tank 11 and the pump 32.

The pressure valve 31 is additionally connected with the fuel tank 11 via a line 39 and a pressure regulator 38. A pressure sensor 35 is provided for measuring a pressure in the pressure vessel 31 itself. Finally, the pressure vessel 31 is connected with the engine, not shown, via a regenerating valve 36 arranged in a line 37.

The operation of the arrangement 10 is described in the following.

In order to fill the fuel tank 11, the pump 32 is put into operation by actuating the tank closure 21, so that the gases located in the fuel tank 11 are pumped into the pressure vessel 31 and the pressure in the fuel tank 11 is accordingly reduced. The tank closure 21 cannot be opened until there is no longer overpressure in the fuel tank 11. Overpressure in the fill pipe 20 is prevented in that the flap 24 initially closes the fill pipe 20 because of its inherent weight and because of the internal pressure in the fuel tank 11.

When the pressure in the fuel tank 11 has been reduced from about 4 bar to atmospheric pressure, the fueling of the fuel tank 11 is begun. For this purpose, the fuel is introduced into the fill pipe 20. When the fuel level in the fill pipe 20 exceeds the upper mark set by the sensor 22, the pump 32 continues to operate, so that a vacuum pressure occurs in the fuel tank 11 and the fuel is sucked into the latter. Accordingly, no fuel vapors can escape outward. The communicating tubes 14 ensure that both chambers 12, 13 of the fuel tank 11 are filled. When the fuel level reaches a lower mark formed by the sensor 23 at the conclusion of the fueling process after the supply of fuel has been cut off, the pump 32 is also turned off.

In order to prevent air being pumped out of the atmosphere into the fuel tank 11 and, via the latter, into the pressure vessel 31, the fill pipe 20 has a siphon 25. A fueling nozzle which may possibly be used for fueling is sealed in the free end 26 of the fill pipe 20, for example, by a sealing device, not shown.

The inlet 33 to the pressure vessel 31 is secured by a float valve 34 with reed switch which can turn off the pump 32 so that no fuel is pumped into the pressure vessel 31.

If liquid condenses in the pressure vessel 31, it is guided back into the fuel tank 11 i via a suitable device.

If air from the atmosphere should reach the pressure vessel 31, this can be determined via pressure monitoring in the pressure vessel 31 by means of the pressure sensor 35, the switching of the float valve 34 or the like. The air can then be guided out via the regenerating valve 36 in a controlled manner and supplied to the engine.

The fuel delivery is carried out in such a way that pressure which is greater than the fuel system pressure of the engine is applied to the fuel tank 11 from the pressure vessel 31 via the pressure regulator 38. The pressure regulator 38 regulates, for example, the gas pressure in the pressure vessel 31 from about 60 bar to the pressure of 4 bar required for the fuel tank 11. The pressure regulator 38 has a crash valve which closes the pressure regulator 38 in the event of an accident and prevents fuel from exiting the fuel tank.

The removal of fuel is carried out at the lowest location in the fuel tank 11, namely, at the fuel tank outlet 15. The communicating tube 14 ensures that the fuel is removed from both chambers 12, 13 of the fuel tank 11. The pressure regulator 16 performs the function of regulating the fuel which is at a pressure of about 4 bar down to the fuel system pressure of the engine. The fuel which is pressure-regulated in this manner is guided to the engine via line 17.

What is claimed is:

1. Apparatus for storing liquid fuel in a vehicle having an engine, said apparatus comprising
    a fuel tank having a fuel tank inlet and a fuel tank outlet, said outlet being connected to said engine via a fuel system;
    a pressure vessel for storing gases;
    a delivery device having a suction side connected to said fuel tank and a pressure side connected to said pressure vessel;
    a line having a gas pressure regulator connected with the pressure vessel and with the fuel tank;
    means for reducing the pressure in said fuel tank to atmospheric pressure while fuel is being added to said fuel tank via said inlet; and
    means for increasing the pressure in said fuel tank to more than the pressure in said fuel system while fuel is being discharged from said tank via said outlet.

2. Apparatus as in claim 1 wherein said fuel tank is rated at an operating pressure of 4 bar and said pressure vessel is rated at an operating pressure of 60 bar.

3. Apparatus as in claim 1 wherein said pressure regulator comprises a crash valve.

4. Apparatus as in claim 1 wherein said delivery device is a pump, said apparatus further comprising a float valve between said fuel tank and said pump.

5. Apparatus as in claim 1 further comprising a fill pipe connected to said fuel tank inlet, said fill pipe having a free end.

6. Apparatus as in claim 5 further comprising a sealing device at said free end of said fill pipe.

7. Apparatus as in claim 5 further comprising an upper fuel level sensor and a lower fuel level sensor in said fill pipe, said upper fuel level sensor signaling said delivery device to operate when fuel is sensed, said lower fuel level sensor signaling said delivery device to turn off when fuel is not sensed.

8. Apparatus as in claim wherein said fill pipe has a siphon adjacent to said tank inlet.

9. Apparatus as in claim 1 further comprising a check valve at said fuel tank inlet.

10. Apparatus as in claim 1 further comprising a pressure sensor in said pressure vessel.

11. Apparatus as in claim 1 further comprising a regenerating valve connected between said pressure vessel and said engine.

12. Apparatus as in claim 1 further comprising a pressure regulator connected between said fuel tank outlet and said fuel system.

13. A method for operating a fuel tank having a fuel tank inlet and a fuel tank outlet, said method comprising
    pumping fuel vapors out of said fuel tank and into a separate pressure vessel via a delivery device so that the pressure in said fuel tank is reduced;
    filling the fuel tank with fuel while operating the delivery device;
    switching off the delivery device at the conclusion of the filling process;
    closing the fuel tank inlet;
    introducing fuel vapors from the pressure vessel into the fuel tank so that the pressure in the fuel tank is increased; and
    delivering the fuel under increased pressure from the fuel tank outlet without a separate pump.

14. A method as in claim 13 wherein the pressure in the fuel tank is at least 4 bar while the fuel is being delivered.

15. A method as in claim 13 wherein the pressure of fuel delivered from the fuel tank outlet is reduced by means of a pressure regulator.

16. A method as in claim 13 wherein the fuel is introduced into the fuel tank via a fill pipe which is connected to the fuel tank inlet.

17. A method as in claim 16 wherein, while fuel is being introduced to said tank, said delivery device is switched off and on by at least one fuel level sensor in said fill pipe.

18. A method as in claim 16 wherein said fuel is introduced into said tank via a siphon in the fill pipe.

19. A method as in claim 13 wherein the delivery device is switched on by the actuation of a tank closure.

20. A method as in claim 13 further comprising measuring the pressure in the pressure vessel and using the measured pressure to determine the fuel level in the fuel tank.

21. A method as in claim 13 wherein said fuel vapor is introduced into said tank via a pressure regulator.

* * * * *